W. W. Brigg.
Churn.

No. 92,788.        Patented July 20. 1869.

Witnesses
Edwin James
John S. Hollingshead Jr.

Inventor
William W. Brigg
per J. E. F. Holmead
Attorney

United States Patent Office.

WILLIAM W. BRIGG, OF HOME, TENNESSEE.

Letters Patent No. 92,788, dated July 20, 1869.

IMPROVEMENT IN CHURNS.

The Schedule referred to in these Letters Patent and making part of the same.

*To all whom it may concern:*

Be it known that I, WILLIAM W. BRIGG, of Home, in the county of Greene, and State of Tennessee, have invented certain new and useful Improvements in Atmospheric Churns; and I do hereby declare that the following is a full, clear, and exact description of the same, reference being had to the accompanying drawing, and to the letters of reference marked thereon, making part of this specification, in which—

Figure 1:
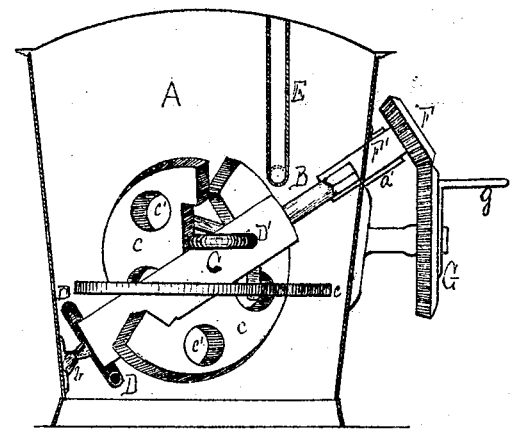
Figure 1 is a horizontal sectional view.
Figure 2:
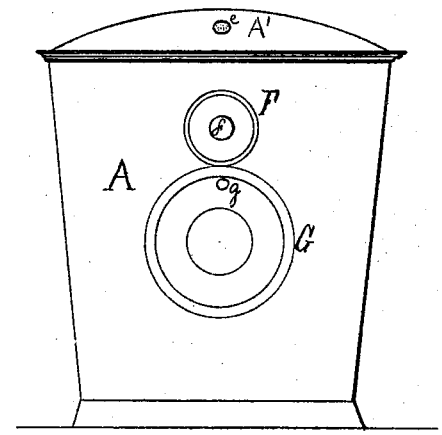
Figure 2 is a front view of the side of the tub, to which the gearing is attached.
Figure 3:
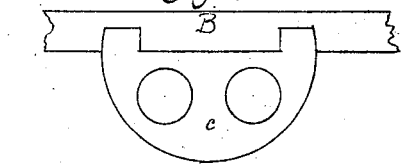
Figure 3 is a plain view of the hollow shaft, with wing or blade attached.
Figure 6:
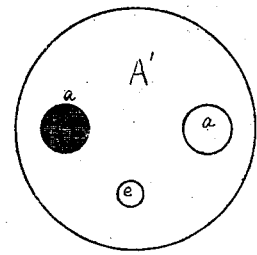
Figure 6 is a view of the top or cover.

The nature of my invention consists in securing on a hollow shaft a series of blades or wings, arranged at such an angle that the shaft, being placed obliquely or diagonally across the body of the churn, when motion is imparted to the same, will work on the well-known principle of the screw.

This hollow shaft has its lower bearing in a step, arranged at a suitable angle to allow the desired direction to be given to the agitator, and as near to the bottom of the tub as the position of the lower air-tubes will allow.

The shaft has its upper bearing in a tube-neck attached to the pinion-wheel, which passes through a hollow tube-bearing, arranged near the upper section of the tub, the pinion-wheel being constructed with an aperture in its centre, for the admission of air.

My invention also consists in connecting with the hollow shaft two or more deflecting-tubes, that extend out into the mass of cream, discharging therein a continuous current of air; and also in arranging near the bottom of the shaft two or more discharge-pipes.

My invention also consists in connecting, with a suitable opening in the top or cover of the churn, an air-pipe, that can be made of length sufficient to descend any desired distance into the milk or cream.

It will be observed that by my plan, which is both simple and practical, a continuous stream of air is admitted to the cream or milk during the process of churning, and the amount admitted is exactly in proportion to the speed at which the churn is driven.

It requires no argument to demonstrate, if pure, sweet butter is desired, the necessity of fresh air being introduced into the mass of cream during the process of churning, in order to carry off the offensive and deleterious gases generated, and which, if not carried off, but allowed to incorporate themselves with the butter, impart to the same a rancid flavor from which no amount of after-working can entirely free it.

Practical experience has fully attested the fact that all these injurious gases can be readily driven off, if a sufficient supply of fresh oxygen can be so introduced as to entirely permeate the mass being worked, and, as a consequence, pure and sweet butter will be produced, and the tedious labor of after-working in a great measure entirely saved.

I am aware that many attempts have been made, and artificial appliances, such as bellows, fans, &c., have been repeatedly tried, in order to secure the required quantity of oxygen; but, while in many instances they have been not only complicated, but expensive, none have as yet been introduced that successfully attain the object. The defect always has been that the current of air was not so discharged as to insure the permeating of the entire mass.

In most instances the air is discharged at or near the top of the cream, and the extent to which it was caused to pass through the mass depending entirely on the power of the means or mechanism used.

By my arrangement all these objections are removed, and without any artificial appliance or agent, I secure a continuous current of air, which is not only, through the pipes at the lower section of the tube, discharged at the bottom of the mass, but also through the deflecting-tubes, continually poured into the centre or body of the same.

Another great advantage of my process is found in the fact that the amount of air fed to the cream is in exact ratio to the speed at which the butter is made, for the air being conveyed to the hollow shaft, through the opening in the pinion, the degree of rapidity with which the same is caused to revolve, regulates the amount admitted.

It will be seen that by placing the dasher diagonally across the churn, and placing the paddles or blades thereon, at the angle shown, when motion is imparted to the same a vacuum or whirlpool is, as it were, created near the bottom of the shaft, which, in my churn, is continuously being filled with pure air, which, passing upward through the cream, passes out through ventilating-openings in the top or cover, carrying with it all injurious gases and other impurities.

I have also found, in connection with the system of introducing fresh air, that working the dasher on the diagonal-screw principle, the particles have a much greater tendency to coalesce, the milk is more entirely freed from the butter, and in reality the latter is worked, during the process of churning, more thoroughly.

To enable others skilled in the art to make and use my invention, I will now proceed to describe its construction and operation.

A is the box or tub of the churn, which may be made in the form shown, which is that of the ordinary slopbucket, or in any other desired, and of either metal or wood. I prefer the former, not only in consequence of its durability, but also on account of the readiness with which it can be thoroughly cleansed and kept entirely free from all musty, sour, or fetid odor.

A' is the top or cover of the churn, and may be constructed with a rim-flange that, entering the body of the churn, will produce a perfectly tight joint. In this top, A', there are two or more ventilator-openings, $a\ a$, which may be covered with gauze, or otherwise protected.

B is the dasher-shaft, and consists of a hollow tube, pointed and closed at its lower end. It is provided with a square head, and open at its upper end. This tube, B, has its bearing in a step, $b$, arranged near the bottom of the tub, and at such an angle as to allow the shaft to pass obliquely or diagonally across the churn. This shaft B has its upper bearing in a tube-neck, F'', attached to the pinion-wheel F, and which passes through a hollow tube-bearing, $a'$, arranged on the outside of the churn, and near the top of the same.

C is a diagonal boxing or casing, which encases the tube-shaft B nearly its entire length. To this boxing or casing C are secured three or more blades or wings, $c\ c$. These blades or wings $c\ c$ are arranged and secured at such an angle as to represent a screw in position and effect. They are perfectly flat, and may be provided with two or more openings, $c'\ c'$, and are so placed on the shaft as to move over, and as near to the bottom of the churn as possible.

D D are discharge-pipes or tubes arranged near the lower section of the tube, and on which the lower section of the boxing or casing C rests.

D' D' are curved deflecting-pipes or tubes, which pass through openings in the upper section of the boxing or casing C.

These pipes D D D' D' are connected with suitable openings in the tube B, and firmly soldered or otherwise connected thereto.

E is an air-pipe, which passes a short distance through an opening, $e$, in the top or cover A' of the churn, and is firmly secured therein. This pipe may be of any desired length, so as to enter the cream and discharge the air at any given point. I usually construct it of such a length that its mouth or elbow is on a line with the discharge-openings of the deflecting tubes D' D'.

F is a pinion-wheel, and is provided with a centre opening, $f$, which connects with a hollow neck, F'', which, passing through the tube-bearing $a$, receives the square head of the shaft B, and forms a perfectly tight joint therewith.

G is a gear or driving-wheel, which works in suitable bearings, G', arranged on the outside of the tub. This wheel G is provided with a crank or handle, $g$, by which it is freely revolved.

It will be seen that the dasher can readily be driven at a very high rate of speed, and that the rate can be multiplied at pleasure, the degree of speed that can be attained depending on the difference of the ratio of the diameter of the pinion and driving-wheels F G, the air being admitted and conveyed to the tube B through the opening $f$ and neck-tube F''. The speed at which the wheel F is revolved regulates the amount of air that is conveyed to the cream, thus always insuring that the supply of oxygen shall be proportionate to the rapidity at which the butter is made.

Figure 5:
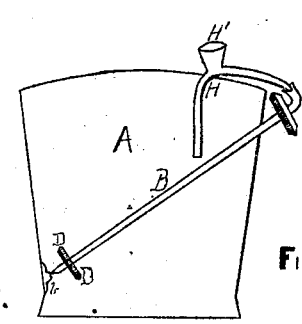
Figure 5 is an arrangement of pipes, showing a modification of the plan by which a continuous current of atmospheric air may be introduced.
Figure 4:
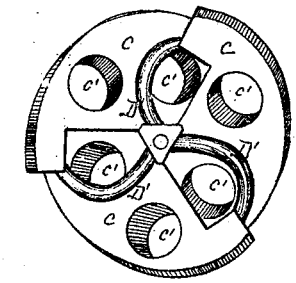
Figure 4 is a top view, looking down, of the hollow shaft, blades, and tubes.

The pipe E or the deflecting pipes D' D' may either be dispensed with without affecting my invention, or, instead of these, the modification shown in fig. 5, with the siphon H and funnel H', may be used with equal advantage.

In either case the pipes D D, discharging at the bottom of the mass of cream, in the vacuum therein formed, a continuous current of pure air, all injurious and impure gases will be forced out and carried off with the escaped air, through the openings $a\ a$ in the top or cover A'.

Having thus fully described my invention, what I claim as new, and desire to secure by Letters Patent of the United States, is—

1. The hollow shaft B, when the same is so placed that it works in suitable bearings on the opposite sides of the tub, and is provided with two or more tubes, D D D' D', and blades, $c\ c$, the latter being so attached as to run in angular directions, the whole being combined and arranged in such a manner that when motion is imparted to the dasher it will work on the principle of the screw, substantially as described.

2. Pinion-wheel F, having a hollow neck, F'', centre opening, $f$, hollow tube, B, step $b$, and when the same are arranged and operate as described, as and for the purpose specified.

In testimony whereof, I have signed my name to this specification, in the presence of two subscribing witnesses.

WM. W. BRIGG.

Witnesses:
J. L. PARISH,
A. G. FLOYD.